(12) United States Patent  
Posselius et al.

(10) Patent No.: US 9,155,250 B2  
(45) Date of Patent: Oct. 13, 2015

(54) COMPRESSION ROLLS ON BALER PICK UP

(71) Applicant: CNH Industrial America LLC, New Holland, PA (US)

(72) Inventors: John H. Posselius, Ephrata, PA (US); Christopher A Foster, Mohnton, PA (US); Kevin M. Smith, Narvon, PA (US); Edward H. Priepke, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/340,000

(22) Filed: Jul. 24, 2014

(65) Prior Publication Data

US 2014/0331635 A1 Nov. 13, 2014

Related U.S. Application Data

(62) Division of application No. 13/175,102, filed on Jul. 1, 2011, now Pat. No. 8,820,040.

(51) Int. Cl.
| | |
|---|---|
| A01D 39/00 | (2006.01) |
| A01D 43/02 | (2006.01) |
| A01D 75/00 | (2006.01) |
| A01F 15/00 | (2006.01) |
| A01F 15/08 | (2006.01) |
| A01F 15/10 | (2006.01) |
| A01F 15/07 | (2006.01) |

(52) U.S. Cl.
CPC ............. *A01F 15/00* (2013.01); *A01F 15/07* (2013.01); *A01F 15/08* (2013.01); *A01F 15/0825* (2013.01); *A01F 15/10* (2013.01)

(58) Field of Classification Search
CPC ........... A01F 15/0705; A01F 2015/077; A01F 15/106; A01F 15/07; A01F 15/10; A01D 89/00; A01D 89/001; A01D 43/085; A01D 43/006
USPC .......................................................... 56/341
See application file for complete search history.

(56) References Cited

U.S. PATENT DOCUMENTS

| | | | |
|---|---|---|---|
| 2,469,580 | A | 5/1949 | Scranton |
| 2,644,283 | A | 7/1953 | Rogers et al. |
| 3,914,926 | A | 10/1975 | Braunberger et al. |
| 4,009,559 | A | 3/1977 | Mast |
| 4,034,543 | A | 7/1977 | Voth et al. |
| 4,062,172 | A | 12/1977 | Rice et al. |

(Continued)

FOREIGN PATENT DOCUMENTS

| | | |
|---|---|---|
| DE | 4102034 A1 | 7/1992 |
| DE | 4344585 A1 | 6/1995 |

(Continued)

*Primary Examiner* — Árpád Fábián-Kovács  
(74) *Attorney, Agent, or Firm* — Patrick M. Sheldrake; Seyed V. Sharifi T.

(57) ABSTRACT

A baler comprises a pick-up assembly configured to pick-up crop material; a compression assembly comprising at least one pair of opposing compression rollers configured to generate a pressure on the crop material as it passes between the compression rollers; and a bale chamber, wherein the pre-compressed crop forms a bale. The compression rollers define an adjustable gap therebetween. By adjusting the gap, pressure exerted on the crop material as it passes between the compression rollers may be controlled, resulting in bales of varying density.

15 Claims, 8 Drawing Sheets

(56) References Cited

U.S. PATENT DOCUMENTS

| | | |
|---|---|---|
| 4,169,347 A | 10/1979 | Phillips |
| 4,228,638 A | 10/1980 | Rabe et al. |
| 4,262,478 A | 4/1981 | Pentith |
| 4,446,678 A | 5/1984 | Smith |
| 4,499,714 A | 2/1985 | Hollmann |
| 4,510,741 A | 4/1985 | Campbell et al. |
| 4,510,861 A | 4/1985 | Campbell et al. |
| 4,534,285 A | 8/1985 | Underhill |
| 4,580,398 A | 4/1986 | Bruer et al. |
| 4,597,249 A | 7/1986 | Bowden, Jr. |
| 4,604,855 A | 8/1986 | Krone et al. |
| 4,619,106 A | 10/1986 | van der Lely |
| 4,625,502 A | 12/1986 | Gerhardt et al. |
| 4,656,812 A | 4/1987 | Busse et al. |
| 4,686,812 A | 8/1987 | Bruer et al. |
| 4,803,832 A | 2/1989 | Crawford |
| 4,838,016 A | 6/1989 | Frogbrook et al. |
| 4,912,914 A | 4/1990 | Wingard |
| 4,926,749 A | 5/1990 | Neale et al. |
| 5,052,170 A | 10/1991 | Trenkamp et al. |
| 5,092,114 A * | 3/1992 | Eggenmueller ............... 56/341 |
| 5,115,734 A | 5/1992 | Quartaert |
| 5,224,328 A * | 7/1993 | Viaud ............... 56/341 |
| 5,255,501 A | 10/1993 | McWilliams |
| 5,419,106 A | 5/1995 | Gemelli |
| 5,630,313 A | 5/1997 | Von Allworden et al. |
| 5,819,515 A | 10/1998 | Ratzlaff et al. |
| 5,950,410 A * | 9/1999 | O'Brien et al. ............... 56/341 |
| 6,032,446 A | 3/2000 | Gola et al. |
| 6,050,074 A * | 4/2000 | Clostermeyer ............... 56/341 |
| 6,101,797 A | 8/2000 | Koegel et al. |
| 6,295,797 B1 | 10/2001 | Naaktgeboren et al. |
| 6,421,990 B1 * | 7/2002 | Ohlemeyer et al. ......... 56/10.2 R |
| 6,425,232 B1 | 7/2002 | Desnijder et al. |
| 6,431,981 B1 * | 8/2002 | Shinners et al. ............... 460/6 |
| 6,546,705 B2 | 4/2003 | Scarlett et al. |
| 6,601,375 B1 | 8/2003 | Grahl et al. |
| 6,644,006 B1 | 11/2003 | Merritt et al. |
| 6,655,121 B1 | 12/2003 | Viesselmann et al. |
| 6,681,688 B1 * | 1/2004 | Smith ............... 100/5 |
| 6,688,092 B2 | 2/2004 | Anstey et al. |
| 6,763,761 B1 * | 7/2004 | Smith ............... 100/5 |
| 6,877,304 B1 | 4/2005 | Smith et al. |
| 7,337,603 B2 | 3/2008 | Johnson et al. |
| 7,437,866 B2 | 10/2008 | Smith et al. |
| RE40,761 E | 6/2009 | Truitt |
| 7,743,595 B2 | 6/2010 | Savoie et al. |
| 8,291,687 B2 | 10/2012 | Herron et al. |
| 2004/0083704 A1 * | 5/2004 | Lucand et al. ............... 56/341 |
| 2005/0252389 A1 * | 11/2005 | Krone et al. ............... 100/88 |
| 2010/0115902 A1 * | 5/2010 | Schlesser et al. ......... 56/10.2 R |
| 2012/0000377 A1 | 1/2012 | Verhaeghe et al. |
| 2013/0036921 A1 | 2/2013 | Horstmann |
| 2013/0319263 A1 * | 12/2013 | Roberts et al. ............... 100/43 |

FOREIGN PATENT DOCUMENTS

| | | |
|---|---|---|
| DE | 102005020777 A1 | 11/2006 |
| EP | 0467283 A2 | 1/1992 |
| EP | 0995352 A1 | 4/2000 |
| FR | 1239827 A | 7/1960 |
| JP | 403117426 A | 5/1991 |
| SU | 1404022 A1 | 6/1988 |

* cited by examiner

COMPRESSION ROLLS ON BALER PICK UP

This divisional application claims priority under 35 U.S.C. §120 from co-pending U.S. patent application Ser. No. 13/175,102 filed on Jul. 1, 2011 by John H. Posselius, Christopher A. Foster, Kevin M. Smith and Edward H. Priepke with the same title, the full disclosure of which is hereby incorporated by reference.

TECHNOLOGY FIELD

The present disclosure relates generally to improved balers and methods for forming high density bales of crop materials.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, a pick-up assembly of the baler gathers the cut and windrowed crop material from the ground then conveys the cut crop material into a bale-forming chamber (or bale chamber) within the baler. A drive mechanism operates to activate the pick-up assembly, augers, and a rotor of the feed mechanism. A conventional bale chamber may include a pair of opposing sidewalls with a series of belts, chains, and/or rolls that rotate and compress the crop material into a cylindrical shaped bale. Square balers operate on similar principles but form "slices" which when stacked together form a rectangular or "square" bale.

Current round balers today rely on belt tension to regulate the bale density. However, as belt tension increases, the durability of the belt and rolls decreases. Thus, further increasing belt tension does not serve as a good option to increase bale density. Relatedly, it is also desirable to improve current square balers today to form high density bales.

High density bales are desirable because they would allow people to reduce the numbers of the bales to work with. The present invention is directed to these and other important ends.

SUMMARY

Embodiments of the present invention provides improved balers and methods for forming high density bales. In some embodiments, the present disclosure provides a baler comprising a pick-up assembly; a compression assembly comprising at least one pair of opposing compression rollers configured to generate a pressure on crop material passed therethrough, the at least one pair of opposing compression rollers defining an adjustable gap therebetween, the compression assembly being configured to pre-compress the crop material passed therethrough; and a bale chamber, wherein the pre-compressed crop forms a bale.

In some embodiments of the baler, the pick-up assembly, the compression assembly, and the bale chamber are synchronized.

In some embodiments of the baler, a first compression roller of the at least one pair of opposing compression rollers is fixed to a frame of the baler and the second compression roller of the at least one pair of opposing compression rollers is adjustably supported on a frame of the baler.

In some embodiments of the baler, each of the compression rollers of the at least one pair of opposing compression rollers is adjustably supported on a frame of the baler.

In some embodiments of the baler, the baler further comprises a hydraulic cylinder that links the at least one pair of opposing compression rollers of the compression assembly together.

In some embodiments of the baler, the baler further comprises a spring that links the at least one pair of opposing compression rollers of the compression assembly together.

In some embodiments of the baler, the baler further comprising a pressure sensor, wherein the pressure sensor detects the pressure generated by the at least one pair of opposing compression rollers of the compression assembly on the crop material passed therethrough; and wherein the gap between the at least one pair of opposing compression rollers of the compression assembly is adjustable to maintain the pressure generated by the at least one pair of opposing compression rollers on the crop material passed therethrough. In further embodiments, the baler further comprises a controller operably connected to the pressure sensor and configured to adjust the gap between the at least one pair of opposing compression rollers. In further embodiments, adjustment of the gap between the at least one pair of opposing compression rollers by the controller is manually controlled.

In some embodiments of the baler, the baler further comprising a speed sensor configured to detect the speeds of the pick-up assembly, the compression assembly, and the bale chamber. In further embodiments, the baler further comprises a controller operably connected to the speed sensor and configured to control the synchronization of the pick-up assembly, the compression assembly, and the bale chamber. In further embodiments, the synchronization of the pick-up assembly, the compression assembly, and the bale chamber is manually controlled.

In some embodiments of the baler, the bale chamber is a square-bale chamber.

In some embodiments of the baler, the bale chamber is a round-bale chamber.

In some embodiments, the present disclosure provides a method for pre-compressing a crop material to form a high density bale. The method comprises picking up crop material by a pick-up assembly; pre-compressing the crop material by a compression assembly, wherein the compression assembly comprising at least one pair of opposing compression rollers configured to generate a pressure on crop material passed therethrough, the at least one pair of opposing compression rollers defining an adjustable gap therebetween, the compression assembly being configured to pre-compress the crop material passed therethrough; and baling the pre-compressed material by a bale chamber to form a bale. In some embodiments, the method includes synchronizing the pick-up assembly, the compression assembly, and the bale chamber to optimize the formation of a higher density bale.

In some embodiments, the method further comprises sensing, by a pressure sensor, a pressure generated by the at least one pair of opposing compression rollers of the compression assembly on the crop material passed therethrough; and adjusting, by a controller operably connected to the pressure sensor, the gap between the at least one pair of opposing compression rollers of the compression assembly to maintain the pre-defined pressure generated by the at least one pair of opposing compression rollers on the crop material passed therethrough.

In some embodiments, the method further comprises rigidly affixing a first compression roller of the at least one pair of opposing compression rollers to a frame and adjustably affixing the second compression roller of the at least one pair of opposing compression rollers to a frame.

In some embodiments, the method further comprises adjustably affixing each of the compression rollers of the at least one pair of opposing compression rollers to a frame.

In some embodiments, the method further comprises adjusting the gap between the at least one pair of opposing compression rollers of the compression assembly with a hydraulic system including, for example, a hydraulic accumulator, valves, and at least one hydraulic cylinder.

In some embodiments, the method further comprises adjusting the gap between the at least one pair of opposing compression rollers of the compression assembly with a spring.

In some embodiments, the method further comprises automatically adjusting, by a controller, the gap between the at least one pair of opposing compression rollers.

In some embodiments, the method further comprises manually adjusting the gap between the at least one pair of opposing compression rollers.

In some embodiments, the method further comprises sensing, by a speed sensor, the speeds of the pick-up assembly, the compression assembly, and the bale chamber; and synchronizing, by a controller operably connected to the speed sensor, the pick-up assembly, the compression assembly, and the bale chamber. In some further embodiments, the synchronization by the controller of the pick-up assembly, the compression assembly, and the bale chamber is automatically controlled. In some further embodiments, the synchronization by the controller of the pick-up assembly, the compression assembly, and the bale chamber is manually controlled.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

In some embodiments, the present invention provides an improved baler for forming high density bales of crop materials. The baler of the present invention can be either for square bales or round bales.

Figure 1:
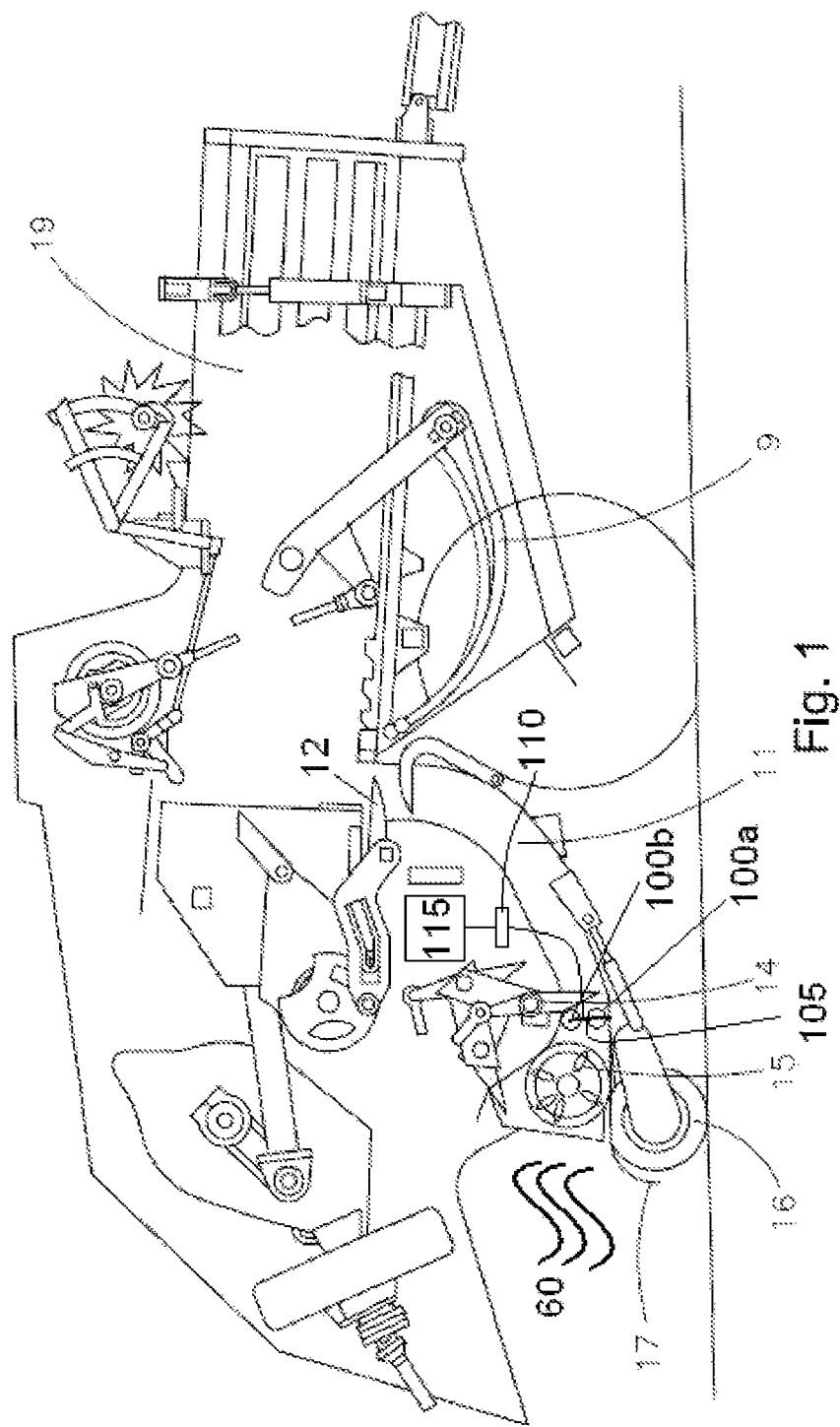
FIG. 1 illustrates a cutaway side elevational view of an exemplary square baler according to an embodiment.

FIG. 1 illustrates an exemplary square baler according to an embodiment of the present invention. When baling a crop material (such as hay) in a square bale, a baler (or baling apparatus) may be outfitted with a pre-chamber 11 that forms a slice of bale material. The pre-formed slice may be injected into the main bale chamber where a bale is formed.

As shown in FIG. 1, the pre-chamber 11 of the square baler may be positioned between a pick-up assembly and a bale chamber 19. The pick-up assembly may include pick-up tines 16, optional baffle plates 17, and one or more centering augers 15. The pick-up tines 16, baffle plates 17 and centering augers 15 may work in concert to pick up crop material 60 and align it for conveyance toward the pre-chamber 11. From the pick-up assembly, the crop material 60 may pass through a gap between one pair of opposing compression rollers, the pair including a lower roller 100a and an upper roller 100b. Depending on the mounting and arrangement of the lower roller 100a and the upper roller 100b, the gap between the two rollers may be adjustable. In some embodiments, one compression roller of the pair of opposing compression rollers (for example, the lower roller 100a) is fixed to a frame of the baler, and the other compression roller of the pair of opposing compression rollers (for example, the upper roller 100b) is floating (e.g., adjustably supported on the baler frame). In some embodiments, each of the compression rollers of the pair of opposing compression rollers is floating (adjustably supported on the baler frame).

The lower roller 100a and the upper roller 100b may be linked together, for example, by a hydraulic cylinder 105, a spring, or the like, to generate a pre-defined pressure on the crop material 60 passing therethrough. By applying the pressure to the crop material 60, the lower roller 100a and the upper roller 100b may act to pre-compress the crop material. In some embodiments, a hydraulic cylinder (such as the hydraulic cylinder 105 in FIG. 1) may be used to provide a reading of the pressure generated by the pair of opposing compression rollers on the crop material 60 passed therethrough. The lower roller 100a and the upper roller 100b may be driven by a motor to rotate towards one another so that the crop material 60 may be fed into the gap between the pair of rollers and may be pre-compressed by the pair of the roller as the rollers rotate.

As used herein, to pre-compress a crop material refers to decreasing the structural integrity of the each individual stem of the crop.

The pre-defined pressure generated by the pair of opposing compression rollers to pre-compress crop material passed therethrough depends on the nature of the crop material.

To maintain the pre-defined pressure generated by the lower roller 100a and the upper roller 100b on the crop material 60 passed therethrough, the gap between the lower roller and the upper roller may be adjusted, depending, for example, on the nature and thickness of the crop material that is to pass through the gap (e.g., the thickness of the crop matt). In some embodiments, there may be a pressure sensor 110 that detects the pressure generated by the pair of opposing compression rollers on the crop material passed therethrough; and the gap between the pair of opposing compression rollers of the compression assembly is adjustable/adjusted to maintain the pre-defined pressure generated by the pair of opposing compression rollers on the crop material passed therethrough. In some further embodiments, a controller 115 may be coupled to the pressure sensor 110, and adjustment of the gap between a pair of opposing compression rollers is automatically controlled by the controller. In other further embodiments, adjustment of the gap between the pair of opposing compression rollers is manually controlled by an operator of the baler.

Because of the pressure generated by the lower roller 100a and the upper roller 100b, it is preferable that the lower roller and the upper roller do not touch at any given time when in operation. For example, the gap between the lower roller 100a and the upper roller 100b may have a minimum value or threshold that is always maintained. For example, the minimum value or threshold may be about 1.0 cm, about 1.2 cm, 1.3 cm, 1.4 cm, 1.5 cm, or about 2 cm.

It should be noted the gaps discussed above are shown by way of example only. The actual gap between the compression roller during operation may vary accordingly based upon a number of factors, including but not limited to, amount of crop being pre-compressed simultaneously, forward speed of the baler, type of crop being pre-compressed, and other similar factors.

It may be advantageous to localize reduction of structural integrity of crop materials at the gap between the lower roller 100a and the upper roller 100b. The localization of pre-compressing the crop material will reduce equipment requirements for other parts of the baler such as the bale chamber where bales are formed, for example, by a plunger. For example, by locally pre-compressing the crop material, a denser crop material is fed to the bale chamber. The size and associated pre-compression/stacking force required for the baler forming device may be lowered as the crop material is already pre-compressed. This may also reduce any hydraulic requirements associated with the bale chamber as the force asserted on the crop material is reduced as a result of the crop material being compressed locally at the compression rollers.

Those skilled in the art would be able to select suitable rollers for the compression rollers that pre-compress the crop materials (i.e., the lower roller 100a and the upper roller 100b). Based upon the application and intended use, the material and/or surface design of the rollers can be used as parameters for selection of rollers. For example, a metal roller (such as steel or stainless steel roller) is suitable to meet the pressure requirement needed to pre-compress certain crop materials. For another example, a spiral roller or a high contact roller can be suitable because the small surface features of the spiral roller or the high contact roller can provide crop traction and the large flat surfaces can be suitable to compress the crop. The selection of suitable rollers also depends, in part, on the crop materials to be compressed.

The speed of the lower roller 100a and the upper roller 100b may be synchronized with the other parts of the baler. For example, the pick-up assembly and the bale chamber 19 may be synchronized with the lower roller 100a and the upper roller 100b. In this regard, the capacity of the lower roller 100a and the upper roller 100b matches the capacity of the pick-up assembly and the capacity of the bale chamber 19, and thus the entire baler operates efficiently with a minimized risk of overcollection/clogging.

In some embodiments, the thickness of the crop material that is to pass through the lower roller 100a and the upper roller 100b may be determined by factors such as the speed of the pick-up assembly and the distance between the pick-up assembly and the pair of opposing compression rollers. In some embodiments, an optional series of packer forks; an optional rotary feeder mechanism; or a pair of rotary feeder and cutter can be employed, for example, to control the thickness of the crop material that is to pass through the pair of opposing compression rollers.

Figure 2:
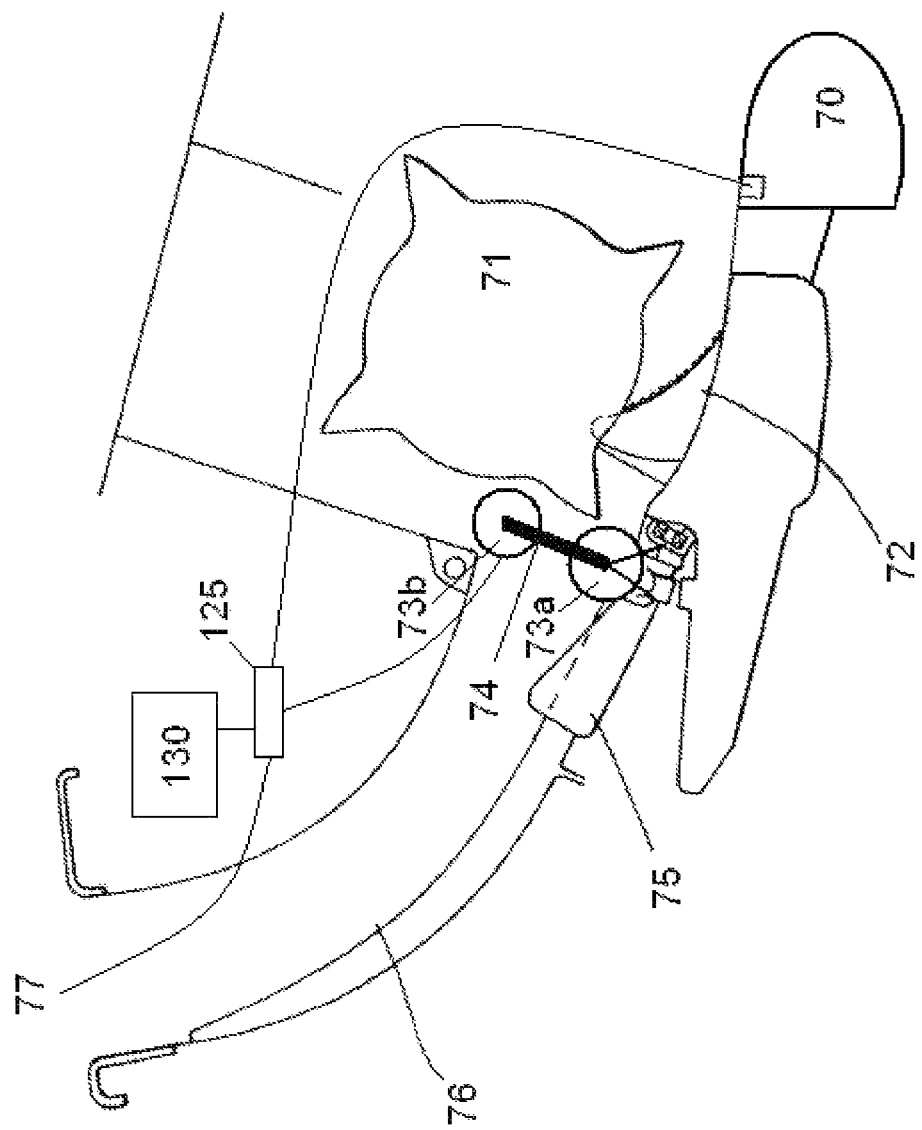
FIG. 2 illustrates a side view of a pick-up assembly, a pair of rotor and cutter, a pair of opposing compression roller, pre-chamber, a bale chamber of an exemplary square baler of the present invention.

Examples of packer forks and rotary feeder mechanism are described in U.S. Pat. No. 6,546,705, the disclosure of which is hereby incorporated by reference in its entirety. As shown in FIG. 2, a crop material (not shown) may be picked up via a pick-up assembly 70 and may pass a rotary feeder 71 and a cutter 72. From here, the crop material may pass through a gap between a lower fixed roller 73a and an upper floating roller 73b. As before, the lower fixed roller 73a and upper floating roller 73b may be configured and arranged such that they generate a pre-determined pressure to compress the crop materials passed therethrough. The pre-compressed material then passes a material sensor or "hay dog" 75 into the pre-chamber 76 and then to bale chamber 77 where bales are formed.

In some embodiments, the baler further comprises a speed sensor 125 or a group of speed sensors. The speed sensor(s) 125 may be configured to detect the speeds of the pick-up assembly, the pair of opposing compression rollers (e.g., lower roller 100a and upper roller 100b), and the bale chamber 77. In some further embodiments, the baler may comprise a controller 130 or a group of the controllers coupled to the speed sensor(s) 125, wherein the synchronization of the pick-up assembly 70, the pair of opposing compression rollers 73a and 73b, and the bale chamber 77 may be automatically controlled by the controller. In some embodiments, the synchronization of the pick-up assembly 70, the pair of opposing compression rollers 73a and 73b, and the bale chamber 77 may be manually controlled by an operator of the baler.

Referring again to FIG. 1, after the crop material 60 is pre-compressed by the lower roller 100a and the upper roller 100b, the crop material may pass an optional element 14, which may be forks or a rotor fork, configured and positioned to convey the pre-compressed crop material into the pre-chamber 11 where it is partially compressed. The pre-chamber 11 may be used to establish how much crop material 60 is in each slice. A baler operator may regulate the amount of material in one slice by varying parameters associated with the pre-chamber 11. Once that amount is reached, the material in the pre-chamber 11 may be injected into the bale chamber 19 by a crop holding finger, stuffer fork, and/or arm 12.

Once a slice is formed and ejected from the pre-chamber 11, a plunger, which may be continually driving like a piston in an engine, compresses the bale, forcing a slice, in FIG. 1 from left to right in the bale chamber 19. In this manner, slices are pushed to the right, as shown in FIG. 1, and compressed while forming the bale.

Square balers are well known in the agricultural industry, and the pick-assembly, pre-chamber, and bale chamber of any of such machines can be used in the square baler of the present invention. Examples of square balers can be found in U.S. application Ser. No. 12/871,439, filed Aug. 30, 2010 and entitled "Method of Tagging Square Bales," the content of which is hereby incorporated by reference in its entirety.

Figure 3:
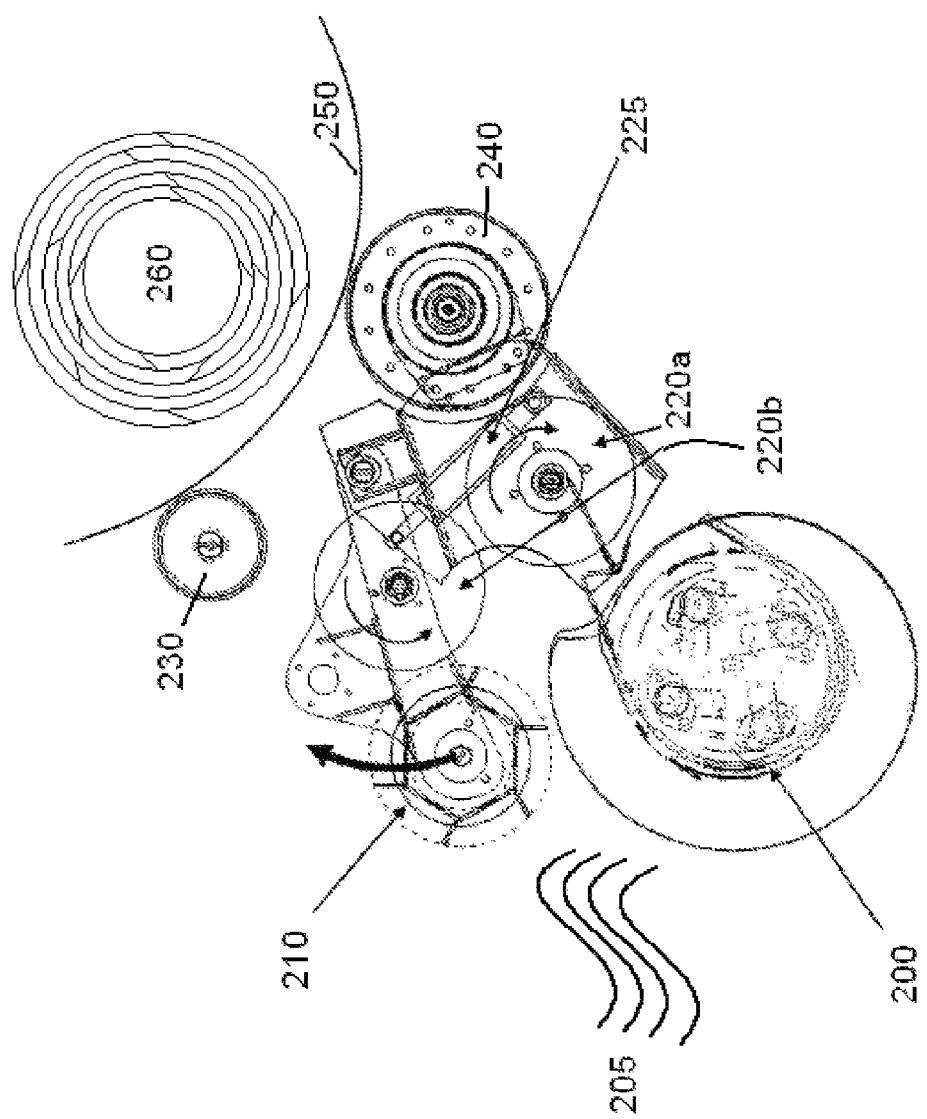
FIG. 3 shows a side view of an exemplary round baler of the present invention.

FIG. 3 shows an embodiment of the present invention including an exemplary round baler. As shown in FIG. 3, a pick-up assembly 200 may pick up crop material 205. From here, an optional feeder roller 210 may feed the crop material 205 through a gap between a pair of opposing compression rollers, specifically roller 220a and roller 220b, which are configured and positioned to generate a pre-defined pressure on the crop material passed therethrough to pre-compress the crop material. The roller 220a and the roller 220b may be similar in construction to the lower roller 100a and the upper roller 100b as shown in FIG. 1. The roller 220a and the roller 220b may be linked together, for example, by a hydraulic cylinder (such as hydraulic cylinder 225), a spring, or the like. The hydraulic cylinder 225 may be configured to generate a pre-defined pressure on the crop material 205 passed through the rollers 220a and 220b to pre-compress the crop material. The gap between the rollers 220a and 220b may be adjustable. In some embodiments, either roller 220a or roller 220b may be fixed to a frame of the baler while the other roller is floating (e.g., adjustably supported on the baler frame). In some embodiments, each of the rollers 220a and 220b may be floating (e.g., adjustably supported on the baler frame).

The pre-defined pressure generated by the rollers 220a and 220b to pre-compress the crop material 205 passed therethrough may depend on the nature of the crop material. A sensor and/or a controller (e.g., pressure sensor 110 and controller 115 as shown in FIG. 1) may be employed to sense and/or control the gap between roller 220a and roller 220b and/or the pressure generated by roller 220a and roller 220b on crop materials 205 passed therethrough.

The crop material 205 pre-compressed by roller 220a and roller 220b may then pass to starter roller 230 and floor roller 240, and a bale chamber 250 where a round bale 260 is formed.

The speed of the pair of opposing rollers 220a and 220b may be synchronized with the other parts of the baler (e.g., the pick-up assembly and the bale chamber). In this regard, the capacity of the pair of opposing rollers 220a and 220b may match the capacity of the pick-up assembly 200 and the capacity of the bale chamber 250, and thus the entire baler operates without major congestion or clogging of crop material. One or more sensors and/or a controller (e.g., speed sensor 125 and controller 130 as shown in FIG. 2) may be employed to detect and control the speed of the pick-up assembly 200, the pair of opposing rollers 220a and 220b, and the bale chamber 250.

Round balers are well known in the agricultural industry, and the pick-assembly and bale chamber of any of such machines can be used in the round baler of the present invention. Examples of round balers can be found in U.S. Pat. Nos. 7,437,866, 6,877,304; 6,688,092; 6,644,006 and 6,295,797, the content of each of which is hereby incorporated by reference in its entirety.

The balers of the present invention may be configured to form high density bales. Comparing to a prior art baler (or a conventional baler), a baler of the present invention can improve the density of a baler by at least about 15%, 30%, 50%, 80%, 100%, 150%, or 200%.

Figure 4:
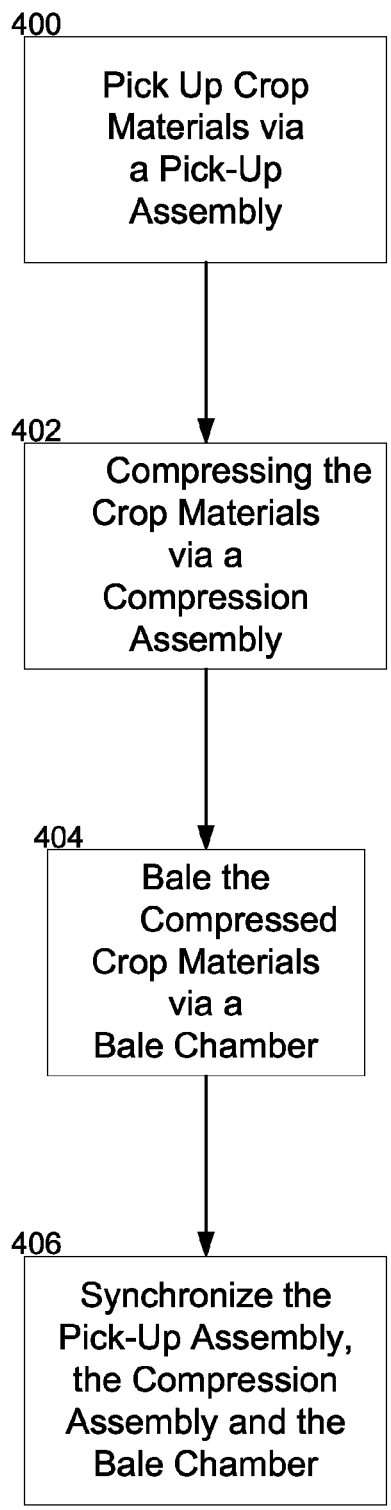
FIG. 4 illustrates an exemplary process for forming high-density bales according to an embodiment.

FIG. 4 illustrates an exemplary process for forming a high density bale according to an embodiment of the present invention. Initially, crop materials are picked up 400 by a pick-up assembly (e.g., pick-up assembly 200 as shown in FIG. 3). Once picked up 400, the crop materials may be pre-compressed 402 via a compression assembly. Exemplary compression assemblies are discussed above in regard to lower roller 100a and upper roller 100b, and rollers 220a and 220b. As discussed above, the compression assembly asserts a pre-compress pressure to the crop materials, resulting in a pre-compressed crop material. Once the crop material is compressed 402, the crop material is baled 404 via a bale chamber (e.g., bale chamber 19 as shown in FIG. 1 or bale chamber 250 as shown in FIG. 3).

Optionally, during the operation of the baling as shown in FIG. 4, two or more components of the baler may be synchronized 406. For example, the pick-up assembly, the compression assembly and the bale chamber may be synchronized 406 such that operation of the baler is performed smoothly without any clogging or congestion of crop material.

Figure 5:
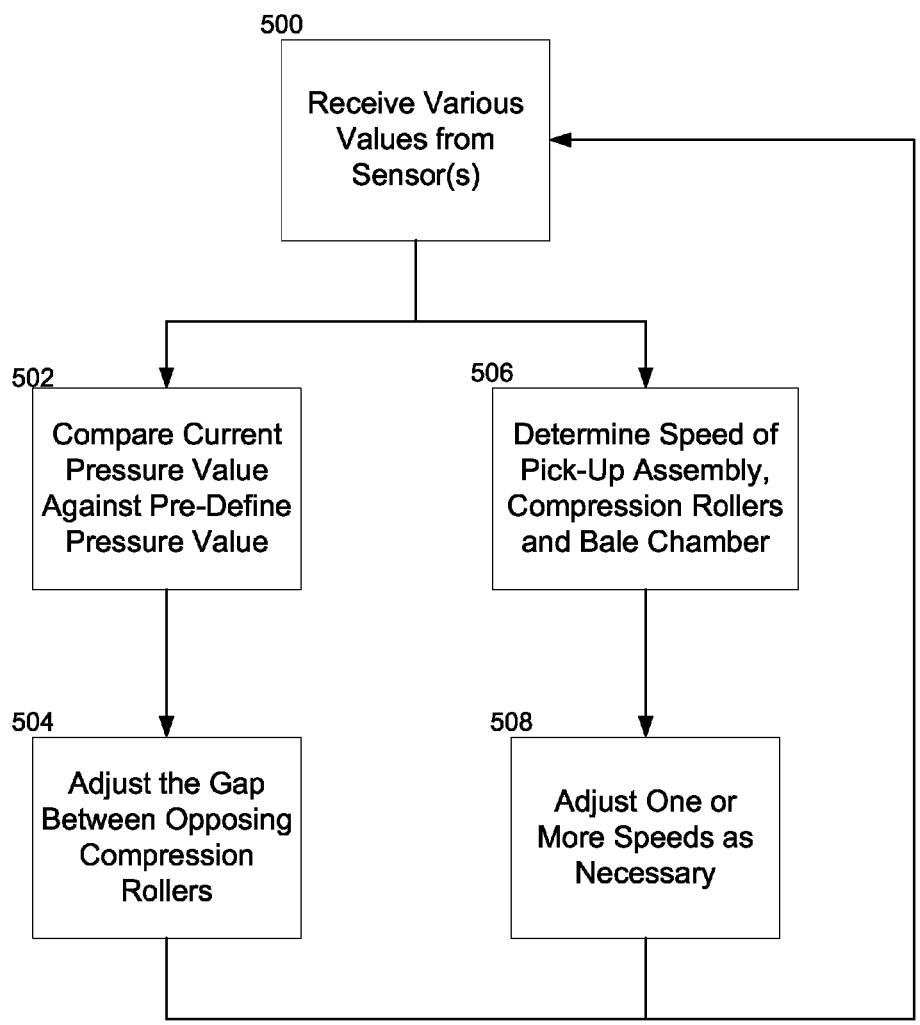
FIG. 5 illustrates an exemplary process for obtaining sensor readings and adjusting the performance of a baler according to an embodiment.

FIG. 5 illustrates an exemplary process for utilizing one or more sensors to optimize high density bale formation as well as the overall performance of a baler. In the example shown in FIG. 5, both a pressure sensor (e.g., pressure sensor 110 as shown in FIG. 1) and a speed sensor (e.g., speed sensor 125 as shown in FIG. 2) are used. However, it should be noted that this is shown for exemplary purposes only. Only one of the sensors may be used, or additional sensors may be added depending on the manufacture and intended use of the baler.

Initially, one or more controllers (e.g., controller 115 as shown in FIG. 1 and/or controller 130 as shown in FIG. 2) receives 500 various input values from the sensors. The controller may compare 502 the current pressure value received 500 from a pressure sensor against the pre-defined pressure value. As discussed above, the pre-defined pressure value may be based upon the type of crop material being baled as well as the desired density of the bales being formed. Based upon the comparison 502, the controller may adjust 504 the gap between the opposing compression rollers by sending a signal to a hydraulic cylinder linking the two rollers to either increase or decrease the gap. Alternatively, the gap may be manually adjusted by an operator of the baler to maintain the current pressure value as close to the pre-defined pressure value as possible.

Similarly, the controller (or a second controller) may determine 506 the speed of various components of the baler based upon the values received 500 from the sensors. For example, the controller may determine 506 the speed of the pick-up assembly, the compression rollers and the bale chamber. The controller may then adjust 508 the speed of one or more of the components in order to synchronize the components, thereby optimizing the throughput of the baler. Alternatively, the speed of the components by be manually adjusted by an operator of the baler.

After either adjustment 504, 508, the controller may receive 500 additional values from the sensor(s) and continue the process illustrated in FIG. 5 until operation of the baler is completed. It should be noted that the pressure and speed adjustment paths are shown in parallel for exemplary purposes only. The adjustments may occur simultaneously as shown in FIG. 5, sequentially one after the other, or according to a set pattern. For example, the pressure exerted by the compression rollers may be determined and adjusted once a minute while the speed of the individual components is monitored and adjusted every 15 seconds.

Figure 6:
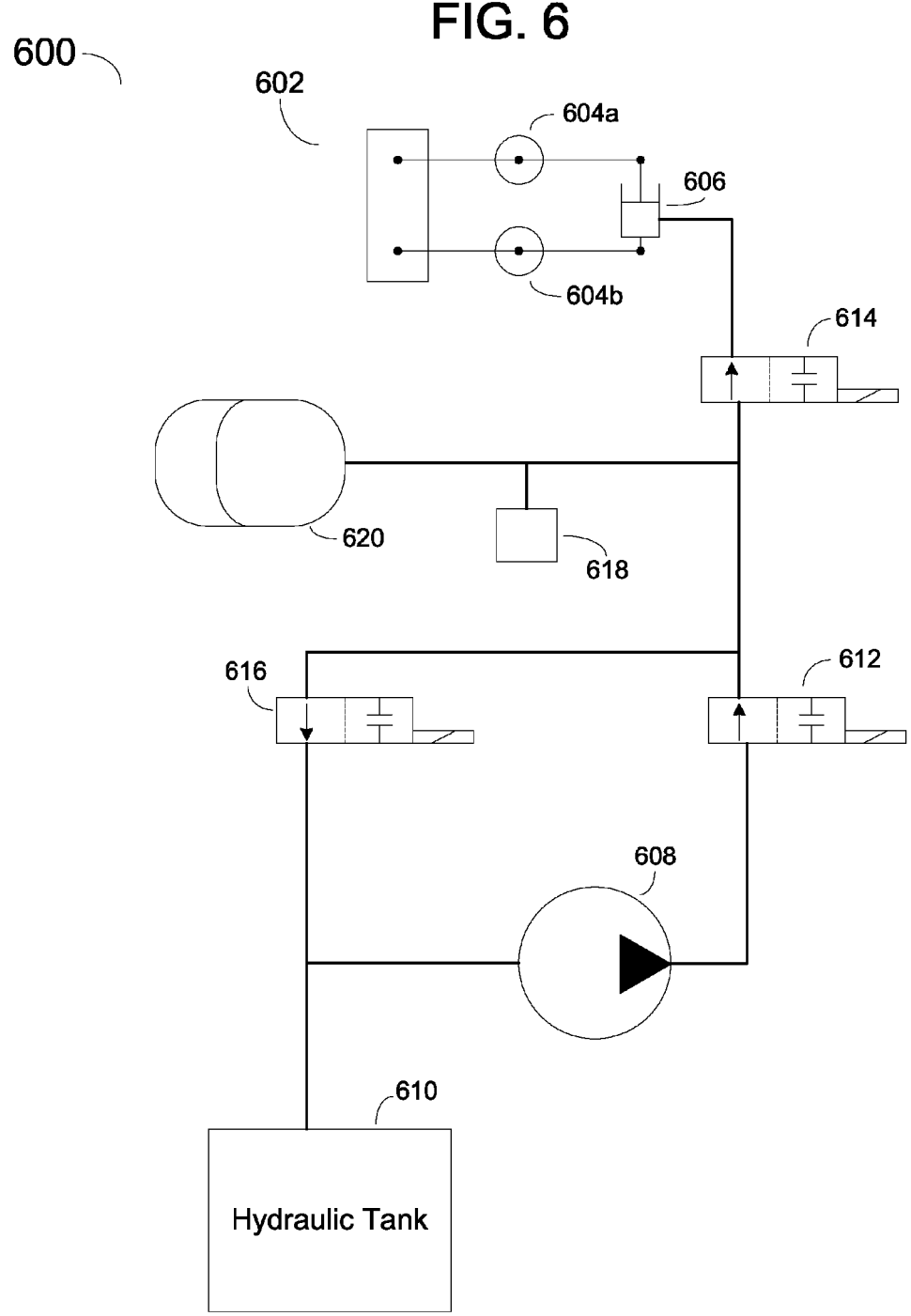
FIG. 6 illustrates an exemplary single acting hydraulic pressure control system according to an embodiment.

FIG. 6 illustrates an exemplary single action hydraulic pressure control system 600 for use with a set of compression rollers. The system 600 may include at least one compression roller assembly 602. The compression roller assembly may include a pair of compression rollers 604a and 604b as well as a hydraulic cylinder 606. A pump 608 may pump hydraulic fluid from a hydraulic tank 610 to the hydraulic cylinder 606 via one or more valves. For example, the pump 606 may pump hydraulic fluid through a pressure increase valve 612 and an isolation valve 614. The isolation valve 614 may be included to isolate the compression roller assembly 602 from any other components on the hydraulic system 600. The hydraulic system may also include a pressure release valve 616 for return of pressurized hydraulic fluid to the hydraulic tank 610.

Depending on the construction and manufacture of the baler, the hydraulic system may also include a pressure sensor 618 and a hydraulic accumulator 620. The hydraulic accumulator 620 may be positioned and configured to reduce pressure variation in hydraulic pressure in the hydraulic system 600 as the hydraulic cylinder 606 moves. Under demand, i.e., during operation of the baler, the hydraulic cylinder 606 may move as the crop mat thickness changes, thereby causing potential pressure variations in the hydraulic system 600. The Hydraulic accumulator 620 may act as a pressure reservoir to reduce these pressure variations. The pressure sensor 618 may be operably connected to a baler monitoring and/or control system for monitoring the pressure in the hydraulic system 600.

Figure 7:
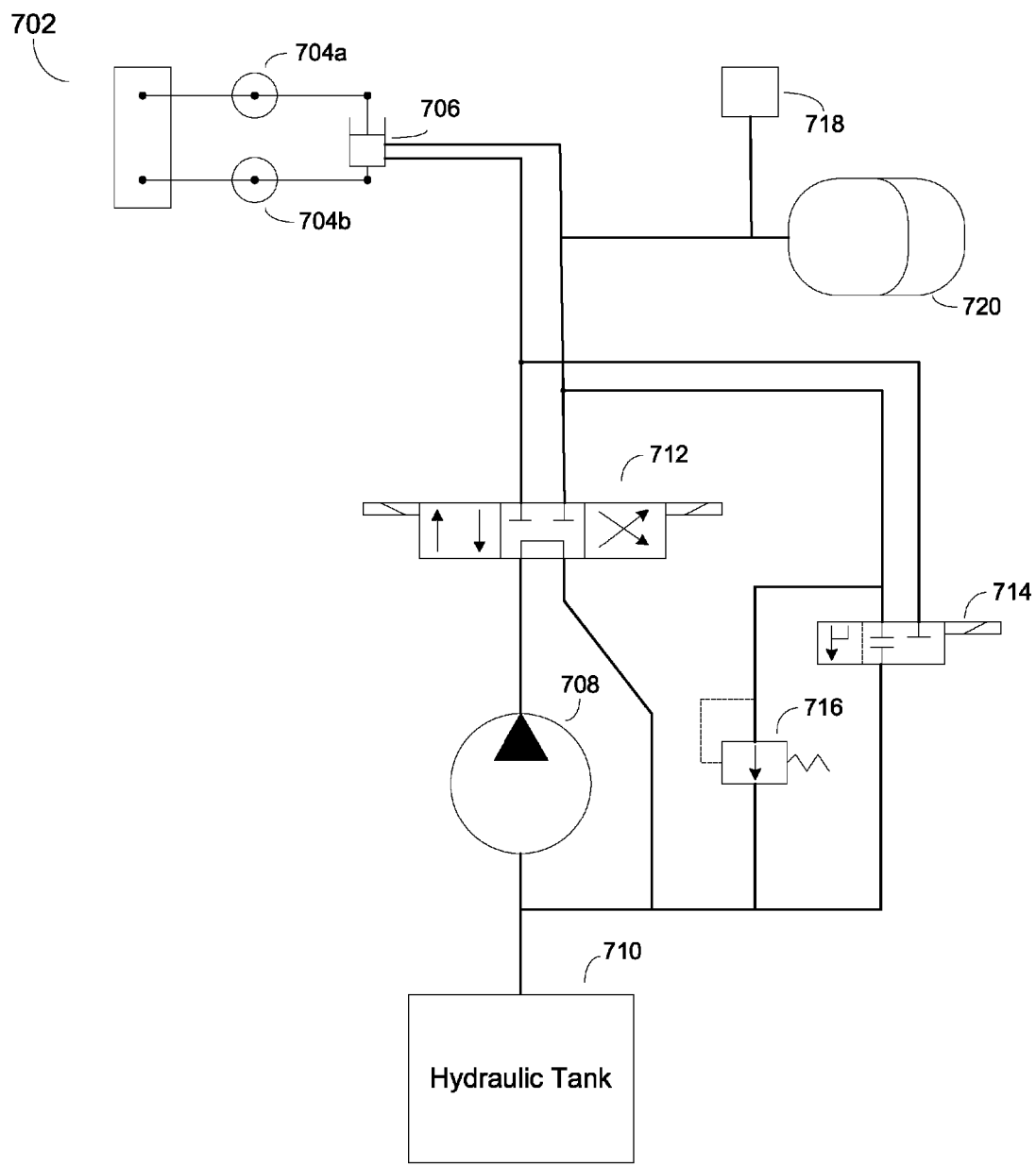
FIG. 7 illustrates an exemplary double acting hydraulic pressure control system according to an embodiment.

FIG. 7 illustrates an exemplary double action hydraulic pressure control system 700 for use with a set of compression rollers. The system 700 may include at least one compression roller assembly 702. The compression roller assembly may include a pair of compression rollers 704a and 704b as well as a hydraulic cylinder 706. A pump 708 may pump hydraulic fluid from a hydraulic tank 710 to the hydraulic cylinder 706 via one or more valves. For example, the pump 706 may pump hydraulic fluid through a double action pressure valve 712. The double action pressure valve 712 may be configured to operate as both a pressure increase valve and a pressure decrease valve. A two-port unloading valve 714 may be included to provide a manual means for removing any pressurized hydraulic fluid from the hydraulic system 700.

Hydraulic system 700 may further include a pressure relief valve 716. The pressure relief valve 716 may be configured to reduce the pressure exerted by the compression rollers 704a and 704b if a foreign object is fed into the baler with the crop material. For example, if a rock is fed into the baler and passed between the compression rollers 704a and 704b, the relief valve 716 may release the pressure on the compression rollers rather than damage the rollers trying to compress the rock.

Depending on the construction and manufacture of the baler, the hydraulic system may also include a pressure sensor 718 and a hydraulic accumulator 720. The hydraulic accumulator 720 may be positioned and configured to reduce pressure variation in hydraulic pressure in the hydraulic system 700 as the hydraulic cylinder 706 moves. Under demand, i.e., during operation of the baler, the hydraulic cylinder 706 may move as the crop mat thickness changes, thereby causing potential pressure variations in the hydraulic system 700. The Hydraulic accumulator 720 may act as a pressure reservoir to reduce these pressure variations. The pressure sensor 718 may be operably connected to a baler monitoring and/or control system for monitoring the pressure in the hydraulic system 700.

Figure 8A:
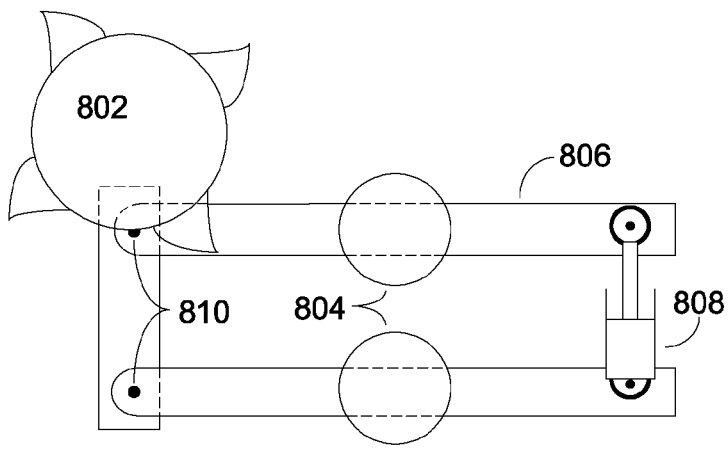
FIGS. 8a-c illustrate various mounting systems and arrangements for compression rollers according to an embodiment.
Figure 8B:
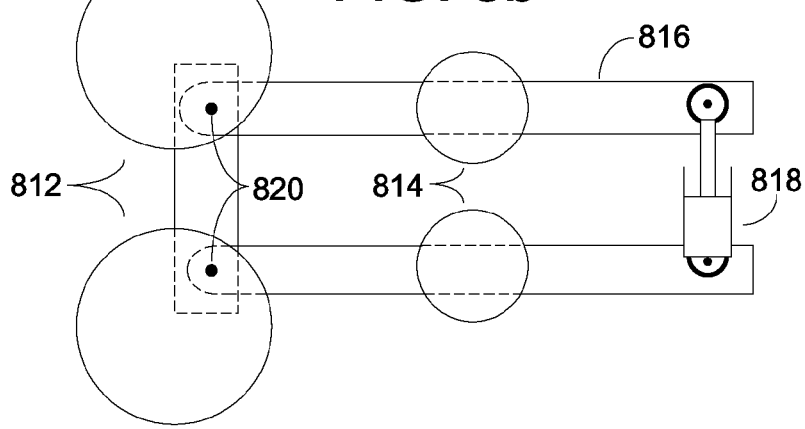
Figure 8C:
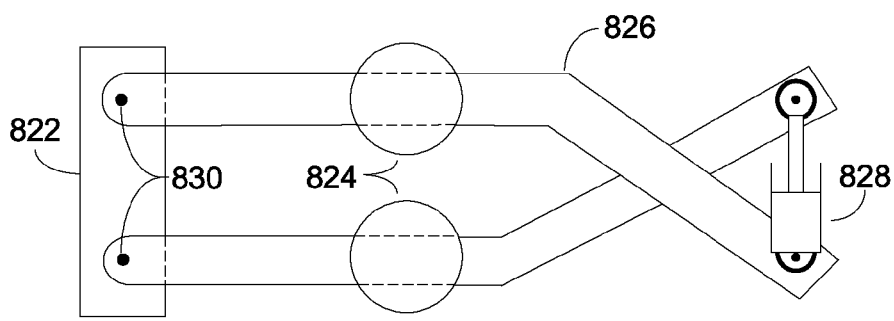

FIGS. 8a-c illustrates various mounting configurations for the compression rollers. FIG. 8a illustrates an exemplary mounting configuration for use with a rotary feeder 802. The pair of compression rollers 804 may be mounted on a steel frame 806. Two or more pivot points or pin joints 810 may be included to allow various components of the steel frame to pivot, thus allowing the compression rollers 804 to move forward or away from each other. The pressure exerted on crop material by the compression rollers 804 may be determined by a hydraulic pressure cylinder 808 in combination with the thickness of the crop material being compressed. The hydraulic cylinder 808 may extend and contract accordingly, depending upon the thickness and density of the crop material, to maintain a constant compression force. For example, if the thickness of the crop material increases, the hydraulic pressure at a rod end of the hydraulic cylinder 808 may also increase, thereby extending the hydraulic cylinder and moving the compression rollers further apart, thereby maintaining a constant compression force exerted on the crop material. Conversely, if the thickness of the crop material decreases, the hydraulic pressure at the rod end of the hydraulic cylinder 808 may also decrease, thereby contracting the hydraulic cylinder and moving the compression rollers 804 closer together.

FIG. 8b illustrates a similar configuration as FIG. 8a. A pair of converging rollers 812 may feed crop material to a pair of compression rollers 814. The pair of compression rollers 814 may be mounted on a steel frame 816. Two or more pivot points or pin joints 820 may be included to allow various components of the steel frame to pivot, thus allowing the compression rollers 814 to move forward or away from each other. Like in FIG. 8a, the pressure exerted on crop material by the compression rollers 814 may be determined by a hydraulic pressure cylinder 818 in combination with the thickness of the crop material being pre-compressed. The hydraulic cylinder 818 may extend and contract accordingly, depending upon the thickness and density of the crop material, to maintain a constant compression force. For example, if the thickness of the crop material increases, the hydraulic pressure at a rod end of the hydraulic cylinder 818 may also increase, thereby extending the hydraulic cylinder and moving the compression rollers further apart, thereby maintaining a constant compression force exerted on the crop material. Conversely, if the thickness of the crop material decreases, the hydraulic pressure at the rod end of the hydraulic cylinder 818 may also decrease, thereby contracting the hydraulic cylinder and moving the compression rollers 814 closer together.

FIG. 8c illustrates an alternative arrangement. The compression rollers 824 may be mounted on an X-shaped steel frame 826 having two crossing arms. Each arm may be pivotably attached to cross-member 822. Two or more pivot points or pin joints 830 may be included to allow various components of the steel frame to pivot, thus allowing the compression rollers 824 to move forward or away from each other. Like in FIGS. 8a and 8b, the pressure exerted on crop material by the compression rollers 824 may be determined by a hydraulic pressure cylinder 828 in combination with the thickness of the crop material being pre-compressed. The hydraulic cylinder 828 may extend and contract accordingly, depending upon the thickness and density of the crop material, to maintain a constant compression force. However, in FIG. 8c, the X-shape of the steel frame 826 results in inverted motion related to the extension and contraction of the hydraulic cylinder. For example, if the thickness of the crop material increases, the hydraulic pressure at a rod end of the hydraulic cylinder 828 may decrease, thereby contracting the hydraulic cylinder and moving the compression rollers further apart, thereby maintaining a constant compression force exerted on the crop material. Conversely, if the thickness of the crop material decreases, the hydraulic pressure at the rod end of the hydraulic cylinder 828 may increase, thereby extending the hydraulic cylinder and moving the compression rollers 824 closer together.

In another embodiment (not shown), two or more sets of opposing compression rollers may be used in series.

Formation of higher density bales is advantageous in the handling of bales.

Although the invention has been described with reference to exemplary embodiments, it is not limited thereto. For example, two pairs of opposing compression rollers can be employed to ensure pre-compression of crop materials. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed is:

1. A baler comprising:
   a pick-up assembly;
   a bale chamber configured for forming bales;

a compression assembly located between the pickup assembly and bale chamber configured for pre-compressing crop prior to entering the bale chamber, the compression assembly comprising at least one pair of opposing compression rollers configured to generate a pressure on crop material passed therethrough, wherein at least one of the at least one pair of compression rollers is mounted to a member moveable with respect to the other compression roller forming a gap therebetween, the compression assembly being configured to pre-compress the crop material passed therethrough;

at least one speed sensor connected to a controller, wherein the at least one speed sensor is positioned and configured to detect the speed of at least one of the pickup assembly, at least one compression roller of the at least one pair of compression rollers and the bale chamber; and wherein at least one compression roller of the at least one pair of compression rollers is driven by a motor and the controller is configured to synchronize the speed of the at least one driven compression roller with at least one of the pick-up assembly and the bale chamber such that the capacity of the at least one pair of compression rollers corresponds to at least one of the pick-up assembly and bale chamber.

2. The baler of claim 1 wherein the speed of the pick-up assembly, the compression assembly, and the bale chamber are synchronized by the connected controller.

3. The baler of claim 1 wherein a first compression roller of the at least one pair of opposing compression rollers is fixed to a frame of the baler and the at least one moveable mounted compression roller is a second compression roller adjustably supported on the member which is a control arm rotatably connected to a frame of the baler to adjust the gap.

4. The baler of claim 1 wherein each of the compression rollers of the at least one pair of opposing compression rollers is adjustably supported on a frame of the baler.

5. The baler of claim 1, wherein the at least one speed sensor comprises a plurality of speed sensors position and configured to detect the speeds of the pick-up assembly, the compression assembly, and the bale chamber.

6. The baler of claim 1 wherein the bale chamber is a square-bale chamber shaped and configured for forming bales having a rectangular perimeter.

7. The baler of claim 1 wherein the bale chamber is a round-bale chamber shaped and configured for forming cylindrical bales.

8. A method for pre-compressing a crop material to form a high density bale comprising:

picking up crop material by a pick-up assembly;

pre-compressing the crop material by a compression assembly, wherein the compression assembly comprising at least one pair of opposing compression rollers configured to generate a pressure on crop material passed therethrough, wherein at least one of the at least one pair of compression rollers is mounted to a member moveable with respect to the other compression roller forming an adjustable gap therebetween, the compression assembly being configured to pre-compress the crop material passed therethrough; and at least one speed sensor connected to a controller, wherein the at least one speed sensor is positioned and configured to detect the speed of at least one of the pickup assembly, at least one compression roller of the at least one pair of compression rollers and the bale chamber; and wherein at least one compression roller of the at least one pair of compression rollers is driven by a motor and the controller is configured to synchronize the speed of the at least one driven compression roller with at least one of the pick-up assembly and the bale chamber such that the capacity of the at least one pair of compression rollers corresponds to at least one of the pick-up assembly and bale chamber baling the pre-compressed material by a bale chamber to form a bale.

9. The method of claim 8, further comprising synchronizing the pick-up assembly, the compression assembly, and the bale chamber using the connected controller.

10. The method of claim 8 further comprising rigidly affixing a first compression roller of the at least one pair of opposing compression rollers to a first frame member of the baler and adjustably affixing the second compression roller of the at least one pair of opposing compression rollers to a second frame member pivotally connected to the baler with respect to the first frame member.

11. The method of claim 8 further comprising adjustably affixing each of the compression rollers of the at least one pair of opposing compression rollers to a frame.

12. The method of claim 8, further comprising adjusting the gap between the at least one pair of opposing compression rollers of the compression assembly with the actuator, wherein the actuator is a hydraulic cylinder is connected to at least one of the compression rollers such that actuation of the cylinder moves the position of the roller.

13. The method of claim 8-further comprising automatically adjusting, by a controller, the gap between the at least one pair of opposing compression rollers wherein the controller is linked to a hydraulic cylinder connected to control the position of at least one compression roller and the pressure sensor detects a pressure within the cylinder.

14. The method of claim 8 further comprising:

sensing, by a speed sensor, the speeds of the pick-up assembly, the compression assembly, and the bale chamber; and synchronizing, by a controller operably connected to the speed sensor, the pick-up assembly, the compression assembly, and the bale chamber.

15. The method of claim 14, wherein the synchronization by the controller of the pick-up assembly, the compression assembly, and the bale chamber is automatically controlled.

* * * * *